Jan. 10, 1950     W. M. RENGO     2,494,106

LEADER REEL

Filed Dec. 9, 1946

INVENTOR
WILLIAM M. RENGO
BY Liverance and
Van Antwerp
ATTORNEYS

Patented Jan. 10, 1950

2,494,106

UNITED STATES PATENT OFFICE 2,494,106

LEADER REEL

William M. Rengo, Kaleva, Mich.

Application December 9, 1946, Serial No. 714,949

2 Claims. (Cl. 242—135)

The present invention relates to a novel and very practical reel, designed for the winding of lengths of leader line thereon for its dispensing or removal, in shorter lengths, as they are to be used in fishing. In practice in many types of fishing, the fishing line is not directly connected to a hook or lure, but is tied to an end of a relative short length of leader line the hook being secured at the opposite end of the leader. The leader is of a transparent material which is not seen by a fish and is connected directly to the hook between it and the main line.

The reel of the present invention is for the purpose of having leader line material ready and accessible at any time during fishing for supplying a line with a leader and hook, if a previously attached leader and hook is lost, or for replacing a hook and leader with a different sized hook and its leader which may occur under conditions which makes such replacements or interchanges difficult. The reel of this invention is of a size which is conveniently carried in the pocket and at any time the desired length of leader line which is to be used, may be withdrawn from the reel and cut at the desired length by severing means being provided so that any subsequent further repetitions of unreeling desired lengths of the leader line and getting them from the main reeled length thereof is quickly, conveniently and easily done.

It is a further advantage and purpose of the present invention to provide a reel of novel construction which will allow the objects and purposes stated, which is light in weight, conveniently small in size and of a novel, economical and sturdy structure.

An understanding of the invention may be had from the following description of a preferred structure of the reel embodying my invention, shown in the accompanying drawing in which Fig. 1 is a side elevation of the reel.

Figure 5:
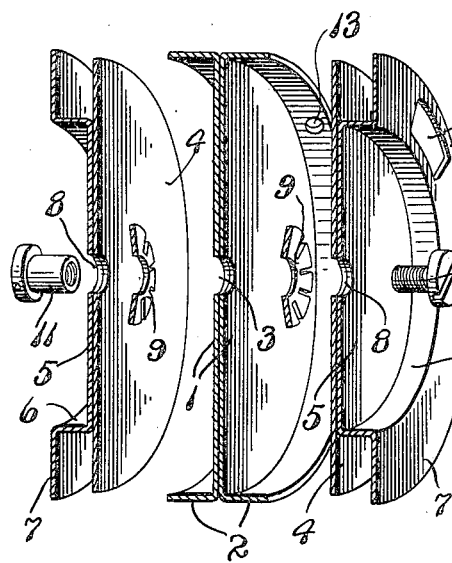

Fig. 5 shown in perspective and in central transverse vertical section the several parts of the reel in disassembled and separated relation.

Like reference characters refer to like parts in the different figures of the drawings.

In the structure shown two cup members of identical form which include a circular wall or bottom 1 and an outwardly extending annular flange 2, each wall having a central opening 3 therethrough. The two walls 1 are located side by side (Fig. 5) and permanently secured together by spot welding or other equivalent connection. This provides a support for the reel which is of sheet metal, pressed and stamped into the form shown and described.

The two annular flanges 2 extend opposite to each other. In the spaces or recesses surrounded by each of the flanges 2 the movable or rotatable portions of the reel are located. There are two of them, each made of two plates of sheet metal. One is a flat circular plate 4 of a dimension slightly less than the inner diameter of the flange 2. The other plate has a circular section 5 from which an annular flange 6 is pressed outwardly for a short distance and which terminates in a terminal flange 7 spaced from and parallel to the plate 4 and its exterior diameter is substantially the same as that of the flanges 2. The plate 4 and the circular section 5 both have central openings 8 and said plate and the circular section are spot welded or otherwise permanently connected.

Figure 4:
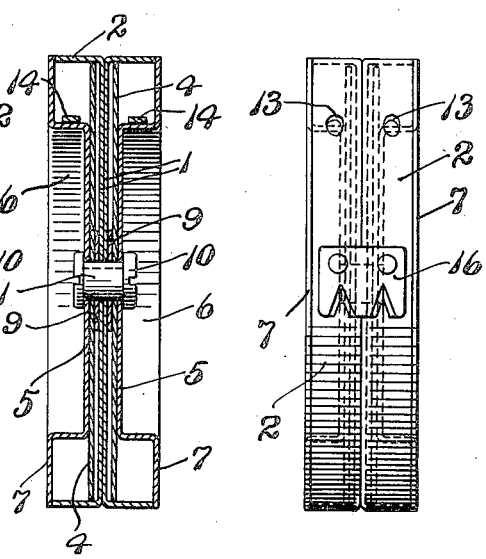
Fig. 4 is a central vertical transverse section.
Figure 3:
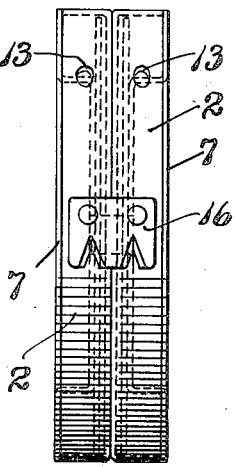
Fig. 3 is a vertical edge elevation of the complete reel.

When the two movable reel members are located within the flanges 2 the several openings 3 and 8 are in alinement. A dished resilient washer 9, preferably radially slotted as shown, is disposed between each of the plates 4 and the adjacent plate 1, said washers having openings in conjunction with the openings 3 and 8. A screw 10 and a cylindrical sleeve nut 11 are used to connect the parts together, each having an outer head which comes against the outer side of a part 5 of the movable reel member. The sleeve 11 extends through all of the openings 3 and 8 and through the washers (Fig. 4) and the screw threads thereinto. Thus the rotatable reel members may turn about the axis of the screw 10 with a substantially free movement checked only by the pressure imparted by the resilient washers 9.

Figure 1:
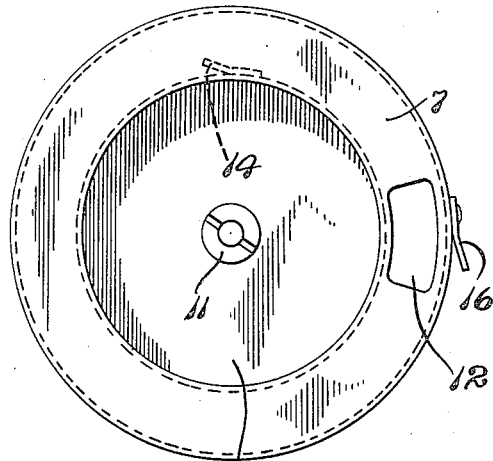
Figure 2:
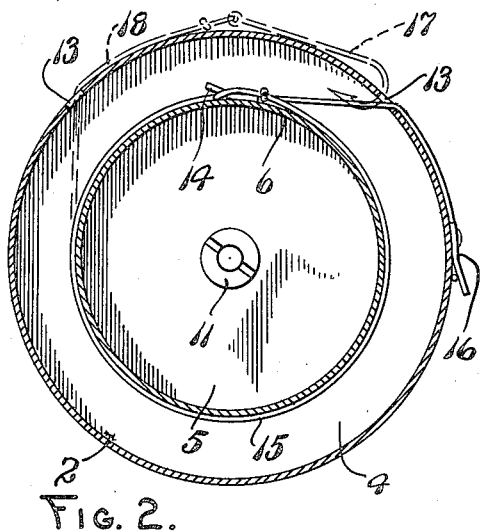
Fig. 2 is a vertical section through the reel shown in Fig. 1 to one side of the middle plane thereof.

Each of the offset flanges 7 has an opening 12 (Fig. 5) therethrough as shown and each of the flanges 2 has at least one and, preferably, two circular openings 13 as shown. When two of the openings are used they are spaced a distance apart from each other. At the outer side of each of the flanges 6 an outwardly extending finger 14 is secured or struck from the metal. At one end of a leader line 15 a loop is provided to engage with the part 14 (Fig. 2) and the line wound around the annular flange or drum 6 in the annular trough between the parts 4 and 7. The free end of the line is then threaded through an opening and brought underneath a plate 16 which is permanently secured to the flanges 2, and has a free edge portion bent outwardly therefrom, and provided at said free edge portion with V-shaped notches having sharpened side edges so that the line may be pulled therein and then to one side against a cutter edge for severance. The outer end of the leader line remaining being wedged and held between the cutter plate 16 and the adjacent outer surface of the flange 2.

Two different strengths of leader lines may be used on the two turnable reel members. The reel is also usable for carrying a hook equipped with a leader, such as the hook indicated in the dash line 17 with the leader 18 attached the hook which at its barbed end is passed through one of the openings 13 and the leader through the other opening 13 and wound around the annular flange 6.

The structure described is of very practical, simple, useful, economical and sturdy character. In size it need not be more than three inches in diameter and from one-half to three-fourths of an inch thick which is large enough to carry a considerable length of leader line or all that will ever normally be needed, and in such size readily carried in a pocket.

The invention is defined in the appended claims and is to be considered comprehensive of all forms of structure coming within their scope.

I claim:

1. A structure of the class described comprising a cup-shaped member of sheet metal having a circular bottom and an outwardly extending continuous flange at its outer edges, said flange having an opening there-through, a reel member comprising an inner circular plate of sheet metal and a second plate of sheet metal having a central circular section of less diameter than the inner circular member of the reel lying there-against and permanently secured thereto, said second member at the peripheral edges of said central section having an outwardly extending annular flange terminating in a terminal flange located parallel to and spaced from said inner circular plate and overlapping the edge of the continuous flange of the cup member, said bottom of the cup-member and said plates having each a central opening therethrough, a headed interiorally threaded sleeve extended through the openings, and a headed screw threaded into said sleeve.

2. A structure of the class described comprising, a cup-shaped member having a circular bottom and a continuous annular outwardly extending flange, said flange having a line-passing opening therethrough, a reel member located therein, said reel member having a continuous annular line-receiving groove therein, means for rotatably mounting said reel member upon said bottom of the cup-member, means for yieldingly resisting the turning movement of the reel member, said reel member comprising an inner circular plate of flat metal, and an outer plate having a central circular section of less diameter than the first mentioned inner plate located there-against and secured thereto, said circular section at its peripheral edges having an outturned annular flange continued in a terminal flange which parallels said inner plate and overlaps the edge of the annular flange of the cup member.

WILLIAM M. RENGO.

REFERENCES CITED

The following references are of record in the file of this patent:

UNITED STATES PATENTS

| Number | Name | Date |
| --- | --- | --- |
| 225,325 | Bingham | Mar. 9, 1880 |
| 303,641 | Howard | Aug. 19, 1884 |
| 319,448 | Brown | June 9, 1885 |
| 660,938 | Tower | Oct. 30, 1900 |
| 1,044,014 | Butts | Nov. 12, 1912 |
| 1,555,751 | O'Neill | Sept. 29, 1925 |
| 1,908,278 | Augell | May 9, 1933 |

FOREIGN PATENTS

| Number | Country | Date |
| --- | --- | --- |
| 416,486 | Great Britain | Sept. 17, 1934 |
| 791,470 | France | Sept. 30, 1935 |